United States Patent [19]

Koenig

[11] 4,075,608
[45] Feb. 21, 1978

[54] MULTIPLE-CHANNEL DATA SWITCH

[75] Inventor: Harry J. Koenig, San Diego, Calif.

[73] Assignee: The United States of America as represented by the Secretary of the Navy, Washington, D.C.

[21] Appl. No.: 650,104

[22] Filed: Jan. 19, 1976

[51] Int. Cl.$^2$ .......................... H04Q 9/00; H04J 3/00
[52] U.S. Cl. .......................... 340/166 R; 179/15 AQ; 179/15 A
[58] Field of Search .......... 340/166 R, 147 C, 147 T, 340/172.5; 179/18 EA, 18 G, 18 GF, 18 J, 18 ES, 15 A; 317/101, 135; 445/1

[56] References Cited

U.S. PATENT DOCUMENTS

| 3,609,668 | 9/1971 | Dupieux et al. ................... 179/18.6 |
| 3,909,786 | 9/1975 | Lawrence ......................... 340/147 C |
| 3,956,593 | 5/1976 | Collins et al. ..................... 179/15 A |
| 3,963,872 | 6/1976 | Hagstrom et al. ............... 179/18 EA |

OTHER PUBLICATIONS

RCA *Technical Notes,* TN No. 847, 10-8-69 (4 sheets), "Very High Speed Digital Circuit Interconnection System", W. Blumenstein & M. Johnson.

*Primary Examiner*—Donald J. Yusko
*Attorney, Agent, or Firm*—R. S. Sciascia; G. J. Rubens; H. Fendelman

[57] ABSTRACT

A data switch which can rapidly configure and reconfigure multiple channels between computer equipments for digital data transmitted at a rate in excess of 10 megabits per second. The switch includes a switch matrix connected between an input and an output voltage level buffer, a mini computer, and control circuitry. The switch matrix comprises three stages, each containing 256 switching elements which are active integrated circuit elements each having 16 data inputs and one data output. A channel is configured through the switch matrix when one switching element in each stage responds to a control signal to couple one of its data inputs to its data output, over a million different channel configurations being possible. Each switching element is heavily grounded to effectively eliminate cross talk between channels and each data input line of each switching element is provided with an amplifier to improve time fidelity of the switch.

12 Claims, 6 Drawing Figures

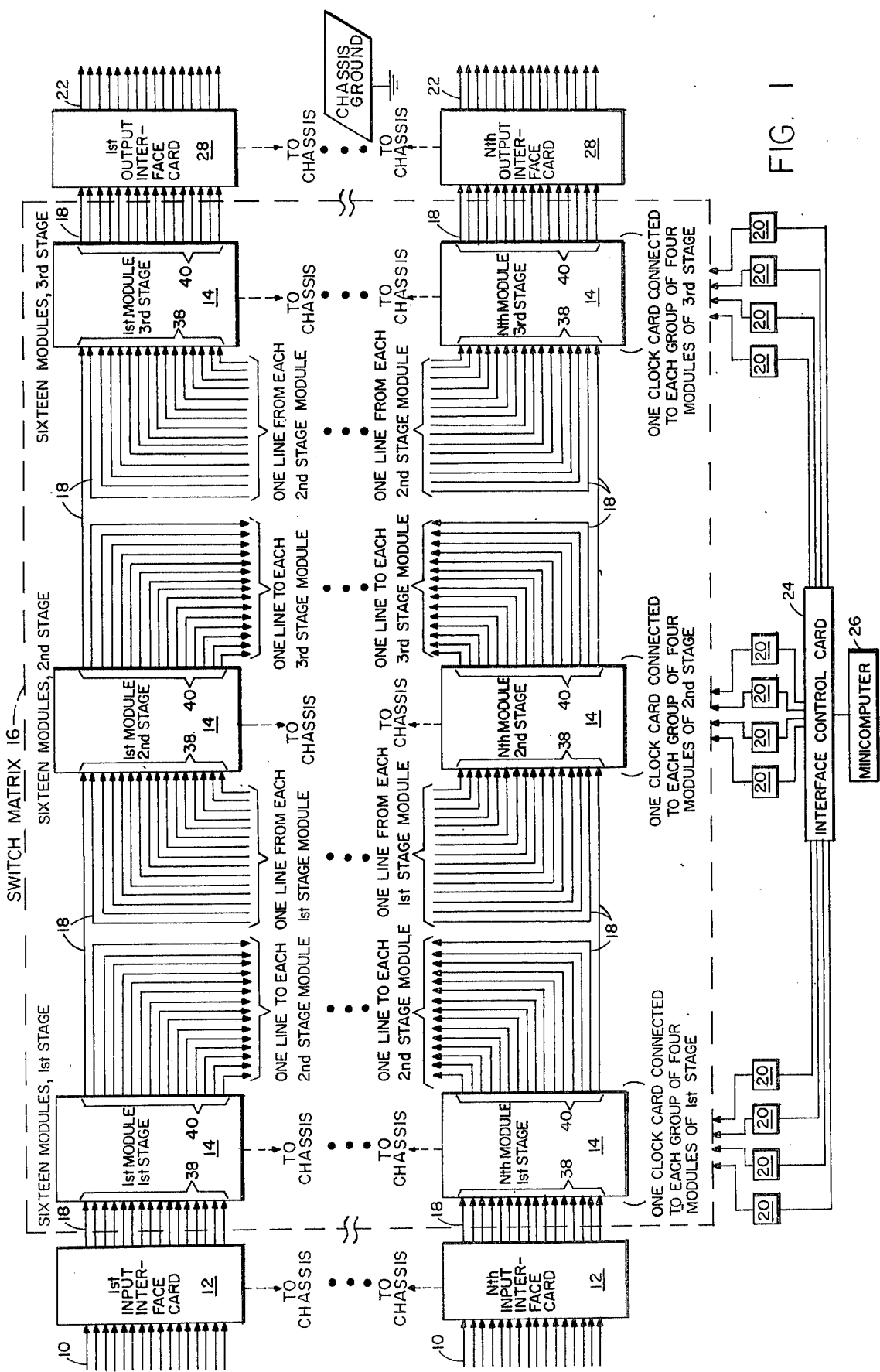

MULTIPLE-CHANNEL DATA SWITCH

BACKGROUND OF THE INVENTION

The invention pertains to switches for transmitting digital data between computer equipments and particularly to such switches for transmitting a very large amount of digital data per unit time, in excess of two gigabits per second, through over 200 different channels.

As far as is known, no prior switch is available for instantaneously (within 50 nanoseconds) configuring and reconfiguring over 200 data transmission channels between computer equipments where each channel transmits data in the form of digital pulses at a rate in excess of 10 megabits per second through switching elements, each of which is an active device. In a switch intended to have this capability, cross talk may be a limiting factor. If the timing of the digital transmission in each of the channels is such that all of the switching elements in the switch must change states simultaneously (within 50 nanoseconds), there may be a substantial change in current flow through the voltage source and ground of each of the switching elements. If the switching elements are not heavily grounded, an unacceptable level of cross talk, or interference between the data transmission in each channel, may occur. In addition, the switch must maintain good time fidelity of the data being transmitted through it.

SUMMARY OF THE INVENTION

The invention provides a switch matrix having multiple inputs and outputs which comprises switching elements arrayed in three stages with an equal number of elements in each stage, each switching element being an active high speed circuit element having data input lines and one data output line. Each switching element is connected to a voltage source, ground, and control means and is responsive to a control signal to couple data applied to one of its data input lines to its data output line. The stages and the switch matrix inputs and outputs are interconnected so that a channel may be rapidly configured or reconfigured from any matrix input to any matrix output by applying a control signal to one switching element in each stage. The total number of possible channel configurations through the matrix is determined by the number of matrix inputs and outputs and by the number of switching elements in each stage. Twisted pairs, which are pairs of conductors entwined around one another with one conductor carrying digital data and the other tied to ground at each of its ends, interconnect the switching elements and the matrix inputs and outputs to provide a substantial ground for each of the switching elements. The switching elements are mounted on printed circuit boards provided with strips of conducting material for connecting the ground terminal of each switching element to a ground plane included within a chassis supporting the switch matrix. The invention further provides control circuitry which includes a mini computer which may be programmed to rapidly configure or reconfigure any desired channel through the switch matrix. Each data input line of each switching element is provided with amplification means to amplify digital data passing through the element, thereby sharpening each digital pulse and improving the time fidelity of transmitted data. Interface means are provided to buffer the voltage level of the inputs and outputs of the switch matrix to the voltage levels of the inputs and outputs of the switch.

STATEMENT OF THE OBJECTS OF THE INVENTION

It is an object of the invention to provide a new and improved data switch for transmitting a large amount of digital data per unit time.

Another object of the invention is to provide a data switch to rapidly configure and reconfigure channels carrying a large amount of digital data between computer equipments per unit time.

Another object is to minimize cross talk between channels in a switch transmitting a large amount of digital data per unit time through a number of different channels.

Other objects, advantages and novel features of the invention will become apparent from the following detailed description of the invention when considered in conjunction with the accompanying drawings.

BRIEF DESCRIPTION OF THE DRAWINGS

FIG. 1 is a block diagram illustrating an embodiment of the present invention.

DESCRIPTION OF THE PREFERRED EMBODIMENT

Figure 5:
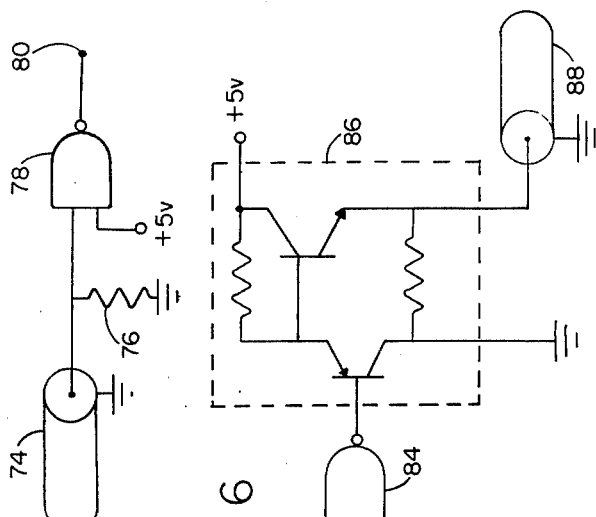
FIG. 5 is a schematic diagram illustrating an input voltage level buffer contained in an input interface card for the embodiment of FIG. 1.

FIG. 1 illustrates a high speed data switch for rapidly configuring and reconfiguring up to 256 channels between computer equipments for digital data transmitted in serial form. The switch may transmit data at the rate of 10 megabits per second per channel, or over 2½ billion bits of digital data per second, and may be connected to computer equipments through coaxial cables. Sixteen input interface cards 12 numbered from one to sixteen, each card being a printed circuit board, comprise an input interface. Each input interface card 12 contains sixteen input voltage level buffers numbered from one to sixteen to buffer the 75 ohm impedance level of input coaxial cables 10 to the transistor-transistor logic (TTL) voltage level of switch matrix 16. Each input buffer has a coaxial cable connector and an output terminal so that the input interface may buffer up to 256 digital data inputs to switch matrix 16.

Switch matrix 16 comprises 48 16 × 16 modules 14 arrayed in a first, a second and a third stage, each stage comprising 16 modules 14 numbered from one to sixteen. Each module 14 has sixteen input terminals 38 numbered from one to sixteen and 16 output terminals 40 numbered from one to sixteen and may couple a data input to any one of its input terminals 38 to any one of its output terminals 40. The $i^{th}$ input terminal of the $n^{th}$ module 14 of the first stage of matrix 16 is connected to the output terminal of the $i^{th}$ input buffer of the $n^{th}$ input interface card 12 through a twisted pair 18. Each twisted pair 18 comprises two conductors entwined together, one conductor carrying digital data and the other being firmly tied to the ground terminal of both the circuit elements it connects. Each module 14 of the first stage is connected to each module 14 of the second stage by having the $i^{th}$ output terminal of the $n^{th}$ module of the first stage connected to the $n^{th}$ input terminal of the $i^{th}$ module of the second stage through a twisted pair 18. Each module 14 of the second stage of the matrix 16 is similarly connected to each of the modules 14 of the third stage. Consequently a data channel may be configured between any of the 256 input terminals 38 of the first stage, the inputs to matrix 16, and any of the 256 output terminals 40 of the third stage, the outputs of matrix 16, through one of sixteen alternate paths through the second stage, 1,048,576 (256 × 256 × 16) different configurations being possible. Each module 14 comprises two cross point cards which are printed circuit boards containing integrated circuits operating as switches to couple the input terminals 38 to the output terminals 40 of each module.

Sixteen output interface cards 28 numbered from one to sixteen, each card being a printed circuit board, comprise an output interface. Each output interface card 28 contains 16 output level buffers numbered frm one to sixteen to buffer the TTL voltage level of switch matrix 16 to the 75 ohm impedance level of output coaxial cables 22. Each output buffer has an input terminal and a coaxial cable connector so that the output interface may buffer up to 256 digital data outputs from switch matrix 16. The $i^{th}$ input terminal of the $n^{th}$ output interface card 28 is connected to the $i^{th}$ output terminal of the $n^{th}$ third stage module through a twisted pair 18.

Clock cards 20 and control interface card 24 to which they are connected are printed circuit boards containing integrated circuits. Minicomputer 26, which may be a UYK-15 minicomputer, provides channel configuration instructions to control care 24, which provides control signals to the modules 14 in switch matrix 16. Each of the sixteen modules 14 in each stage are assigned to one of four groups of four modules, and a clock card 20 is connected to each of the eight cross point cards in each group. There are therefore twelve clock cards 20 in the switch, each clock card 20 regulating channel configurations through the four modules of its group.

Minicomputer 26, in configuring a specified channel, receives an instruction from its operator to connect a specific input coaxial cable 10 and a specific output cable 22. The computer is programmed to determine whether there are any conflichts in connecting the specified input and output cables by inspecting each of three tables within the computer which are continually updated. The first contains the current use status of the 256 inputs to the first stage modules, the second the current use status of the possible paths through the second stage modules, and the third the current use status of the 256 outputs of the third stage modules. If the matrix input or output which is buffered to either the specified input cable 10 or output cable 22 is found to be in use, the computer will warn the operator and ask whether to override. However, if a possible path through a second stage module is in use, the computer will seek a different path through the second stage to avoid the disruption of a channel the operator may wish to retain. When the computer has selected a connection to be made in one module in each stage to configure the specified channel, it sends a twenty bit command word to control card 24, 20 bits being required to select one configuration through the matrix from the 1,048,576 possible. Control card 24 is provided with registers and decoders and registers and decodes the 20 bit command word and then sends control signals to the appropriate clock cards 20 to make the required connections.

The dimensions of each of the printed circuit boards in the switch may be $3\frac{1}{4}$ inches by 7 inches to make the switch compact. Compactness improves the time fidelity of digital data transmitted through the switch and serves to minimize transmission time. Each twisted pair 18 is less than two feet in length to avoid reflection problems.

Figure 2:
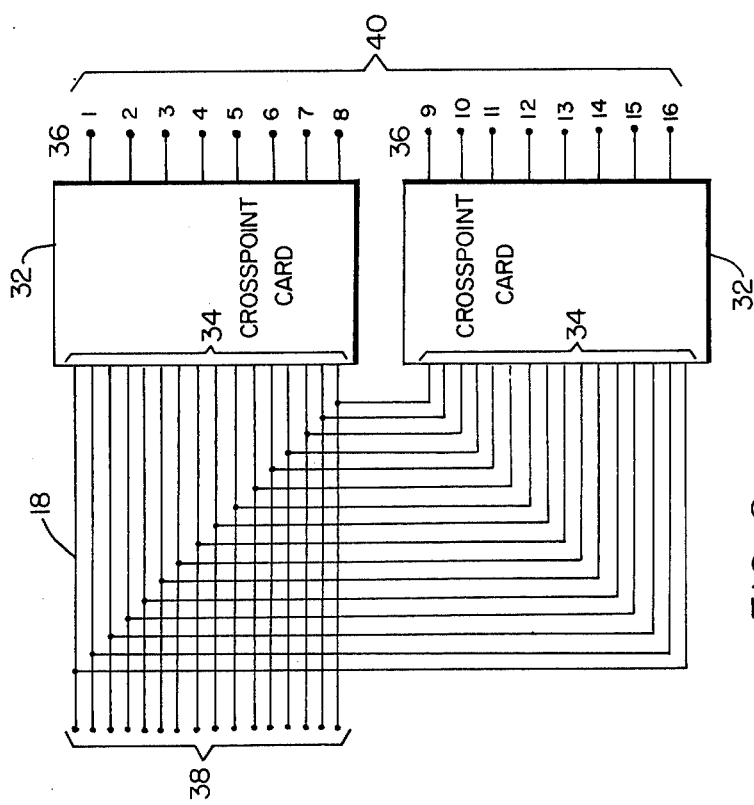
FIG. 2 is a block diagram illustrating the manner in which two cross point cards are connected to form a 16 × 16 module for the embodiment of FIG. 1.

FIG. 2 illustrates the manner in which two cross point cards 32 are connected together to form a module 14. Each cross point card is provided with sixteen data input lines 34 numbered from one to sixteen and eight data output lines 36. Each data input line 34 of both cross point cards 32 is connected to the same-numbered module input terminal 38 through a twisted pair 18 so that any data input to the module is applied to both cross point cards 32. Each of the sixteen data output lines 36 of the two cross point cards 32 is connected to a different output terminal 40 of the module.

Figure 3:
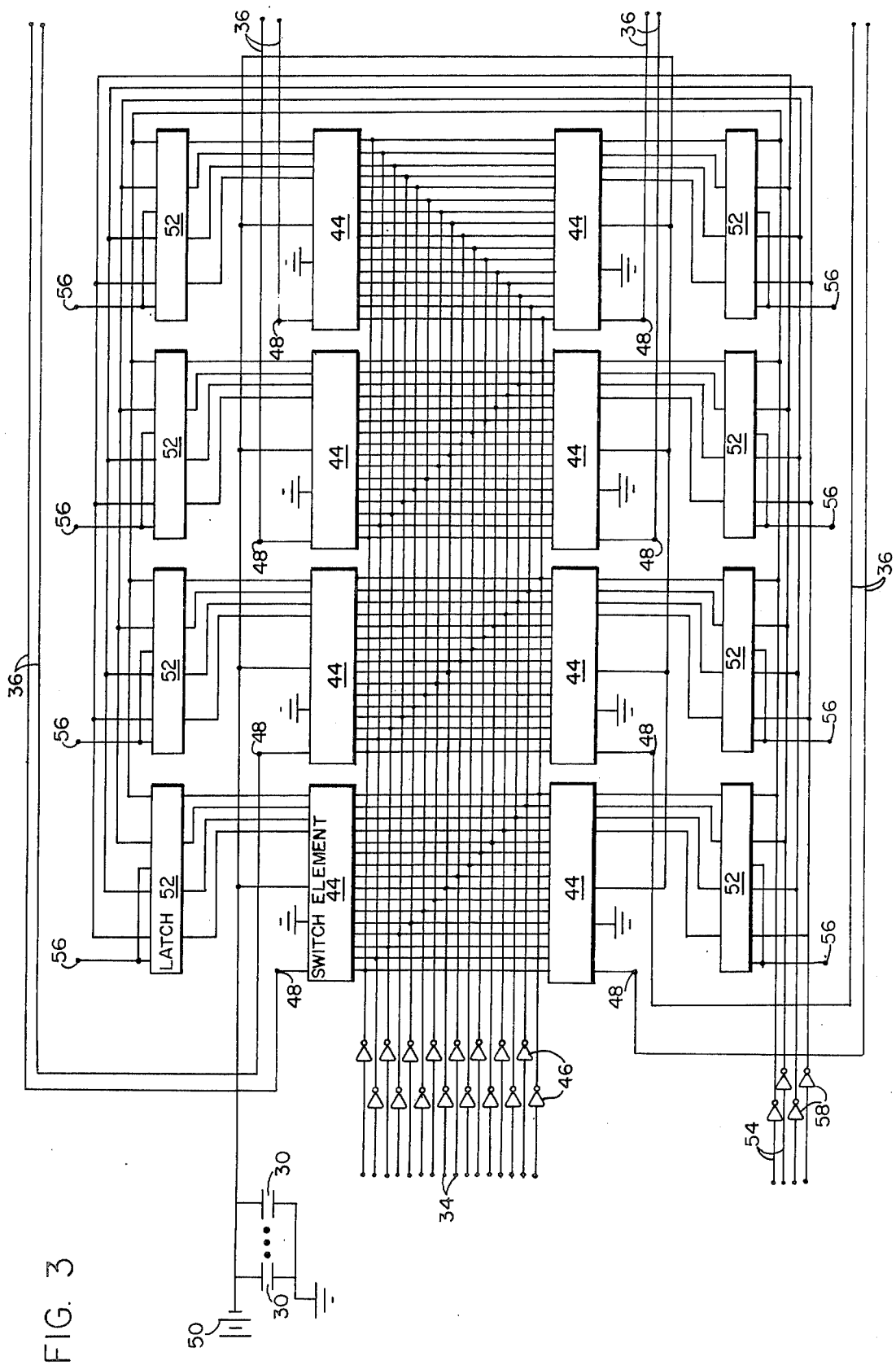
FIG. 3 is a schematic diagram illustrating a cross point card for the embodiment of FIG. 1.

FIG. 3 illustrates a cross point card 32 provided with eight switching elements 44, each of which is an active high speed integrated circuit connected to each of the data input lines 34 of the cross point card. Each of the data input lines 34 contains an inverter-amplifier 46 to buffer in a loading sense the eight switching elements 44 and to sharpen the pulses of digital data passing through it, thereby improving time fidelity. The output terminal 48 of each switching element 44 is connected to a different one of the data output lines 36, and each switching element 44 is connected to a 5 volt voltage source 50, to ground, and to a four-bit latch 52 through which it may receive a four-bit cross point address word. FIG. 3 further illustrates four cross point address lines 54 numbered from one to four which carry a four-bit cross point address word sent from control interface card 24 to each four-bit latch 52 one the cross point card. Same numbered address lines 54 on all eight cross point cards in a group are connected in parallel so that a given four-bit cross point address word is sent to each of the 64 four-bit latches 52 in the group simultaneously. Each four-bit address word is routed through two sets of inverter amplifiers 58 to buffer in a loading sense the pulses of the address word, one set mounted on the clock card 20 controlling the group for packaging reasons and the other set mounted on each cross point card 32 of the group. Each of the 64 four-bit latches 52 has a clocking terminal 56 connected to one of 64 clock output terminals on the clock card regulating the group. If a latch 52 receives a clock pulse through its clocking terminal 56, the four-bit address word on address lines 54 passes through the latch 52 to its connected switching element 44 and causes the element 44 to couple a data input in one of its connected data input lines 34 to its data output line 36, the data being inverted as it passes through the element 44. To configure a path from the $i^{th}$ input terminal 38 to the $j^{th}$ output terminal 40 of the $n^{th}$ module of a stage, control interface card 24 sends a four-bit address word to the address lines 54 of each cross point card of the group including the $n^{th}$ module. The interface card 24 then instructs the clock card 20 regulating the group to select the switching element 44 connected to the $j^{th}$ output terminal 40 of the $n^{th}$ module by clocking the four-bit latch 52 connected to the selected switching element 44, and the selected switching element 44 receives the four-bit address word. In response, the selected switching element 44 connects its $i^{th}$ data input line 34 to its data output line 36. A four bit address word is required to select the $i^{th}$ out of sixteen data input lines.

Each cross point card 32 is further provided with twenty capacitors 30 connected between voltage source 50 and ground for noise suppression. The ground terminal of each switching element 44 and of each inverter-amplifier 46 on each cross point card 32 may be connected to a ⅜ inch by 6 inch strip of conducting material, such as copper, which is brought into contact with a substantial ground plane, which may be a flat sheet of copper contained in the switch packaging structure, or chassis, when the circuit boards are fitted into the chassis. The use of circuit board grounding strips together with the use of twisted pairs 18 provides low-resistance current return paths between each of the elements 44 and amplifiers 46 to minimize cross talk resulting from sudden current surges in the switch matrix.

Figure 4:
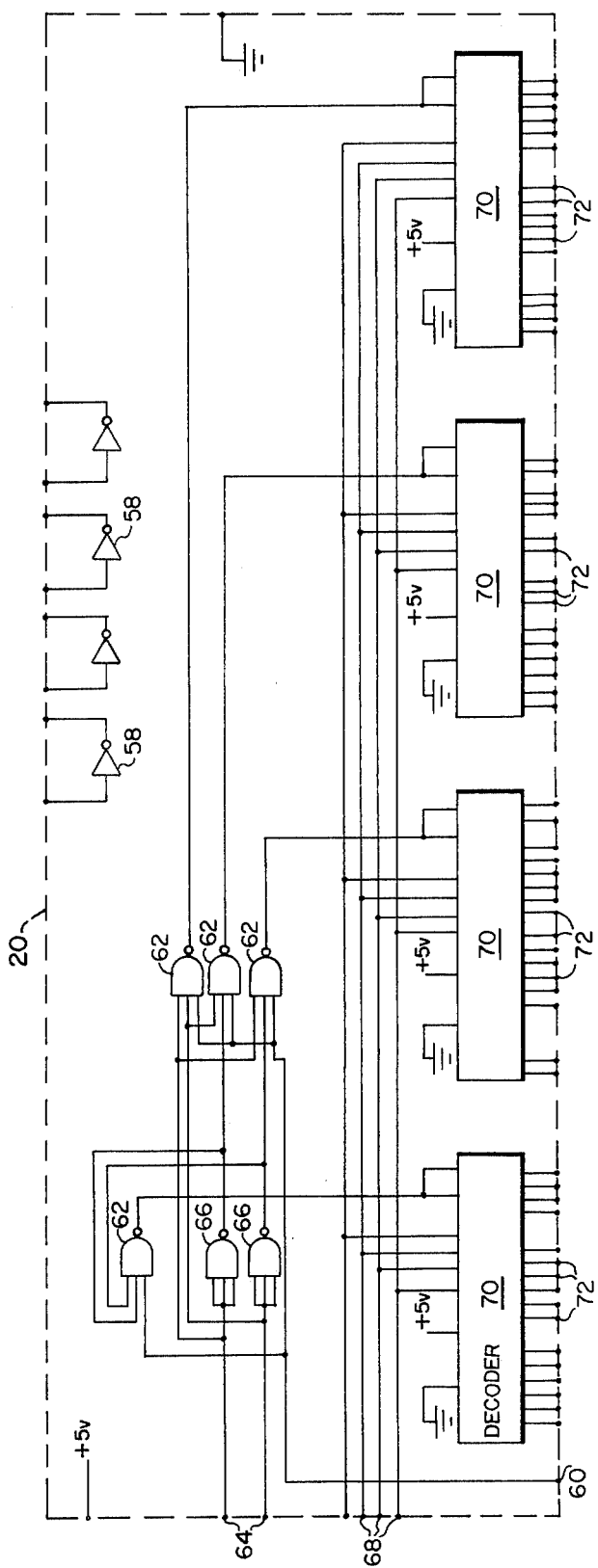
FIG. 4 is a schematic diagram illustrating a clock card for the embodiment of FIG. 1.

FIG. 4 illustrates inverter amplifiers 58 mounted on a clock card 20. If the control interface card 24 sends a four-bit address word to the group regulated by the clock card, it also sends a clock card select pulse to the clock card 20 through terminal 60 which couples the clock card select pulse to NAND gates 62. A two-bit latch select work is also sent from interface card 34 to terminals 64 of clock card 20 and coupled to NAND gates 66 which invert both bits of the two-bit latch select word. NAND gates 62 are interconnected with terminals 64 and NAND gates 66 so that each NAND gate 62 receives a different two-bit word, either the two-bit latch select word or the two-bit latch select word with one or both bits inverted. Having received a clock card select pulse and a two-bit latch select word from the interface card, one of the four NAND gates 62 will clock its connected decoder 70, each of which has received a four-bit latch select word from control interface card 24 through terminal 68. Each decoder 70 is provided with 16 clock output terminals 72, one of which is connected to the clocking terminal 56 of each four-bit latch 52 in the group regulated by the clock card. The decoder receiving the clock pulse then decodes the four-bit latch select word received through terminal 68 and sends a clock pulse through one of its terminals 72 to a four-bit latch 52, thereby selecting a switching element 44. It may be noted that the six bits of latch select information received through terminals 64 and 68 enable the clock card to select one of 64 latches 52 and switching elements 44.

FIG. 5 illustrates an input voltage level buffer which is one of sixteen input buffers mounted on each input interface card 12. Coaxial cable connector 74 is provided to receive a coaxial cable 10, and 75 ohm resistor 76 matches the 75 ohm characteristic impedance of the coaxial cable 10. Digital data from coaxial cable 10 is applied to NAND gate 78, the other input to NAND gate 78 being provided by a positive five volt source. The output of NAND gate 78 is connected to input buffer output terminal 80.

Figure 6:
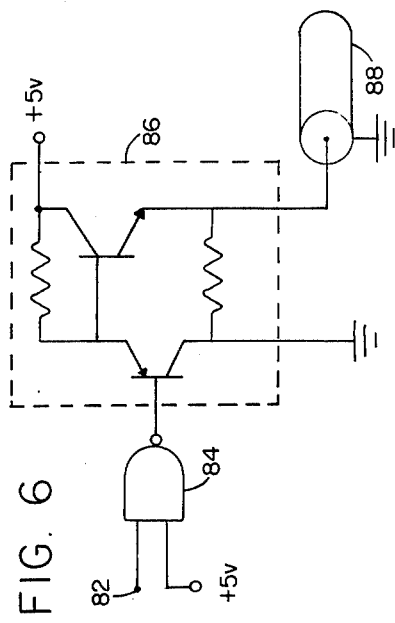
FIG. 6 is a schematic diagram illustrating an output voltage level buffer contained in an output interface card for the embodiment of FIG. 1.

FIG. 6 illustrates an output voltage level buffer which is one of sixteen output buffers mounted on each output interface card 28. An output terminal 40 of a module in the last stage of switch matrix 16 is connected to NAND gate 84 through output buffer input terminal 82 and the other input to NAND gate 84 is provided by a positive five volt source. The output of NAND gate 84 is applied to the input of power amplifier 86 which is provided to drive the 75 ohm resistance of a coaxial cable 22 which is connected to the output interface buffer through coaxial connector 88. Power amplifier 86 comprises an NPN transistor and a PNP transistor connected together as two emitter followers so that there is zero voltage offset in amplifier 86, thereby minimizing the distortion of digital data being power amplified.

Obviously many modifications and variations of the present invention are possible in the light of the above teachings. It is therefore to be understood that within the scope of the appended claims the invention may be practiced otherwise than as specifically described.

What is claimed is:

1. An apparatus having a plurality of input means and a plurality of output means for rapidly coupling digital information applied to any one of said input means to a selected one of said output means, said apparatus comprising:

(a) a matrix means comprising a plurality of consecutively numbered stages wherein the lowest numbered of said stages is the first stage and the highest numbered of said stages is the final stage, each stage including a plurality of switching element means, each of said switching element means having a plurality of element input means and a plurality of element output means, each of said switching element means for coupling digital information applied to one of its said element input means to a selected one of its said element output means in response to a control signal;

(b) an input coupling means for coupling said plurality of input means of said apparatus to the element input means of the switching element means of said first stage;

(c) an element coupling means for coupling the element output means of the switching element means of each stage except said final stage to the element input means of the switching element means of the next-highest-numbered stage;

(d) an output coupling means for coupling said plurality of output means of said apparatus to the element output means of the switching element means of said final stage;

(e) a control means coupled to each of said switching element means of said apparatus for providing a control signal to each of said switching element means;

(f) instruction means coupled to said control means for instructing said control means to provide a control signal to a selected one of said switching element means in each of said stages for configuring a transmission channel for digital information from any one of said input means of said apparatus to a selected one of said output means of said apparatus.

2. The apparatus of claim 1 wherein each of said switching element means of said apparatus is provided with a source terminal connected to a voltage source and a ground terminal connected to a substantial ground means for providing a current path with very low resistance between the ground terminals of any two of said switching element means.

3. The apparatus of claim 2 wherein any two switching elements in adjacent-numbered stages that are coupled together by means of said element coupling means are further coupled by a low resistance conducting means connected between their respective ground terminals for providing a current path with very low resistance between the said respective ground terminals.

4. The apparatus of claim 3 wherein each of the said switching elements of each stage are mechanically attached to one of a plurality of mounting means, all of said mounting means being mechanically attached to a chassis means.

5. The apparatus of claim 4 wherein said chassis means is provided with a central ground means and wherein each of said mounting means provides a ground coupling means for coupling the ground terminal of each of its attached switching element means to said central ground means.

6. The apparatus of claim 5 wherein each of said switching element means of said apparatus is an active high speed integrated circuit and each of said mounting means is a printed circuit board removably attached to said chassis means.

7. The apparatus of claim 6 wherein said central ground means is a flat sheet of conducting material and wherein the ground coupling means provided by each mounting means is a flat strip of conducting material coupled to the ground terminal of each switching element means attached to each mounting means, said strip physically contacting said central ground plane when said mounting means is attached to said chassis means.

8. The apparatus of claim 7 wherein each of said element input means of each of said switching element means of said apparatus contains amplification means for improving the time fidelity of digital pulses transmitted through each of said element input means by sharpening said digital pulses.

9. The apparatus of claim 8 wherein there are three of said stages, each stage having an equal number of said switching element means and each of said switching element means of said apparatus having an equal number of element input means and one element output means.

10. The apparatus of claim 9 wherein digital information simultaneously applied to a number of said input means is simultaneously coupled to an equal number of said output means.

11. The apparatus of claim 10 wherein there are in excess of 200 of said input means and of said output means.

12. The apparatus of claim 11 wherein digital information applied to each of said input means is in serial form transmitted at a rate in excess of 10 megabits per second.

* * * * *